US00RE44192E

(19) United States
(12) Reissued Patent
Lee et al.

(10) Patent Number: US RE44,192 E
(45) Date of Reissued Patent: Apr. 30, 2013

(54) APPARATUS AND METHOD FOR INJECTING SYNCHRONIZED STREAM DATA IN DIGITAL BROADCASTING ENVIRONMENT

(75) Inventors: Yong Ju Lee, Daejeon (KR); Min-Sik Park, Daejeon (KR); Ji-Hoon Choi, Daejeon (KR); Jin Soo Choi, Daejeon (KR); Jin Woong Kim, Daejeon (KR)

(73) Assignee: Electronics and Telecommunications Research Institute, Daejeon (KR)

(21) Appl. No.: 12/846,468

(22) Filed: Jul. 29, 2010

Related U.S. Patent Documents

Reissue of:
(64) Patent No.: 7,406,703
Issued: Jul. 29, 2008
Appl. No.: 10/693,130
Filed: Oct. 23, 2003

(30) Foreign Application Priority Data

Oct. 26, 2002 (KR) ..... 2002-65642

(51) Int. Cl.
*H04N 7/10* (2006.01)
*H04B 1/66* (2006.01)
*H04N 7/16* (2006.01)

(52) U.S. Cl.
USPC .... 725/32; 725/135; 375/240.28; 375/240.26

(58) Field of Classification Search ..... 725/32, 725/135; 375/240.28, 240.26
See application file for complete search history.

(56) References Cited

U.S. PATENT DOCUMENTS

| | | | | |
|---|---|---|---|---|
| 5,774,548 | A * | 6/1998 | Bando et al. | 380/212 |
| 6,266,483 | B1 * | 7/2001 | Okada et al. | 386/248 |
| 6,611,537 | B1 * | 8/2003 | Edens et al. | 370/503 |
| 6,993,789 | B1 * | 1/2006 | Sezan et al. | 725/142 |

FOREIGN PATENT DOCUMENTS

| | | | |
|---|---|---|---|
| KR | 10-1998-069058 | * | 10/1998 |
| KR | 10-2001-0010109 | * | 2/2001 |
| KR | 1020010090979 | | 10/2001 |
| KR | 2002-0066260 | | 8/2002 |
| KR | 2003-0078354 | | 10/2003 |

OTHER PUBLICATIONS

J. Brunheroto et al., "Issue in Data Embedding . . . Digital Television", Jan. 2000, IBM Research, 0-7803-6536-4/00(c), IEEE.*
J. Brunheroto, et al., "Issues in Data Embedding . . . Digital Television", IBM Research, 0-7803-6536-4/00(c) 2000 IEEE.

* cited by examiner

*Primary Examiner* — Hoang-Vu A Nguyen-Ba
(74) *Attorney, Agent, or Firm* — NSIP Law

(57) ABSTRACT

An apparatus and method for injecting synchronized stream data into a Motion Picture Experts Group 2 (MPEG-2) video/audio transport stream for a digital data broadcasting service. The apparatus and method for injecting synchronized stream data calculate the injection time point of data access unit (DAU) that forms the synchronized stream data and injects DAU into the MPEG-2 video/audio transport stream based on the calculated injection time point so that the synchronized stream data could be presented smoothly in a receiver. The synchronized stream data injecting apparatus includes: an additional data storing unit, a synchronized stream data selection/establishment unit, a synchronized stream data analyzing unit, a transport stream analyzing unit, a synchronized stream data injection/management unit, a presentation time stamp re-stamping unit and a multiplexing unit.

63 Claims, 4 Drawing Sheets

APPARATUS AND METHOD FOR INJECTING SYNCHRONIZED STREAM DATA IN DIGITAL BROADCASTING ENVIRONMENT

Matter enclosed in heavy brackets [ ] appears in the original patent but forms no part of this reissue specification; matter printed in italics indicates the additions made by reissue.

*CROSS REFERENCE TO RELATED APPLICATIONS*

*This application is a Reissue of application Ser. No. 10/693,130 filed on Oct. 23, 2003, now U.S. Pat. No. 7,406,703 issued on Jul. 29, 2008, and claims the benefit of Korean Patent Application No. 10-2002-0065642 filed on Oct. 26, 2002, in the Korean Intellectual Property Office. The disclosures of application Ser. No. 10/693,130 and Korean Patent Application No. 10-2002-0065642 are incorporated herein by reference in their entirety.*

FIELD OF THE INVENTION

The present invention relates to an apparatus and method for injecting synchronized stream data into a Moving Picture Experts Group 2 (MPEG-2) video/audio transport stream (TS) for a digital data broadcasting service.

DESCRIPTION OF RELATED ART

A digital broadcasting service has an advantage that diverse multimedia data could be transmitted along with video/audio data. The data that may be provided in a digital broadcasting service includes asynchronous data, synchronous data, synchronized data which are discriminated based on the temporal relationship with video/audio data.

The asynchronous data are those that can be presented independently regardless of video/audio data. The asynchronous data may be used for providing services, such as weather forecast, news, securities reports and the like. In the meantime, most of the data broadcasting services practically used in Korea and other countries are asynchronous data services of a data carousel type. In data carousel type of data service, the asynchronous data is periodically injected into an MPEG-2 video/audio transport stream and transmitted to a receiver. The transmitted data are executed in the receiver upon the request of a user.

Synchronous data use MPEG-2 program clock reference (PCR) and MPEG-2 presentation time stamp (PTS) to temporally restrict the data presented in the receiver.

Synchronized data are presented in connection with video/audio data. They use MPEG-2 PCR and MPEG-2 PTS to coincide the presentation time stamps of their data access units (DAU) and the access units (AUs) of another stream. Synchronized data have two types based on the continuity of data presentation: stream data and non-stream data.

First, synchronized non-stream data are those presented only once at a particular time point of video/audio data. Information on a baseball player appearing at the bat, or information on a place shown up in a particular scene of a soap opera should be presented only once in connection with video data, it can be provided in the form of synchronized non-stream data.

Synchronized stream data are those data that should be presented successively in connection with video/audio data. MPEG video data or MPEG audio data may be used as synchronized stream. What can be provided in the synchronized stream data is past playing scenes or interview scenes that are provided as moving picture when a particular player appears in a sport game.

The synchronized data are presented in connection with other basic stream composing a video/audio program. So, they provide information related to a particular scene. This is different from the services using asynchronous data.

Technologies for providing synchronized data services are being developed in the inside and outside of the country. Among them, Data Interface Working Group (DIWG), which is an embodiment work group of Advanced Television System Committee (ATSC), is a representative one.

DIWG has presented a system model formed of various functional modules to embody a synchronized data broadcasting system. However, since the system model includes a function that a module encoding video/audio data into an MPEG-2 transport stream multiplexes additional data simultaneously, it has a problem that it is not compatible with conventional digital broadcasting apparatuses which multiplex video/audio data only.

In addition, since the system suggested by DIWG is for synchronized non-stream data, it has another problem that it could not provide a service of synchronized stream data.

Meanwhile, the synchronized data are presented at a moment presentation time stamp of the synchronized data is coincided with the reference time of the receiver, which is a system time clock (STC). Synchronized non-stream data are presented only once at a particular time point. So, if the synchronized non-stream data arrives in the receiver before the value of STC becomes equal to the presentation time stamp of the synchronized non-stream data, the data may be presented in the receiver without any problem. The synchronized stream data includes successive DAU and each DAU has its own presentation time stamp. Buffer models for the synchronized stream data are defined for the receiver to present the DAU successively and smoothly. However, the defined receiver buffer models may cause buffer overflow due to the other DAU existing in the buffer, when the DAU arrives in the receiver too quickly, and thus brings about data loss. Therefore, the synchronized stream data should be outputted in consideration of whether DAU has arrived in the receiver.

SUMMARY OF THE INVENTION

It is, therefore, an object of the present invention to provide an apparatus and method for injecting synchronized stream data for a digital data broadcasting service, the apparatus and method calculating an injection time point with respect to each data access unit (DAU) which forms synchronized stream data so that the synchronized stream data could be presented in a receiver smoothly, and injecting the DAU into a Moving Picture Experts Group 2 (MPEG-2) audio/video transport stream at the calculated injection time point.

In accordance with an aspect of the present invention, there is provided an apparatus for injecting synchronized stream data for a digital data broadcasting service, including: an additional data storing unit for storing, managing and outputting additional data used for the digital data broadcasting service; a synchronized stream data selection/establishment unit for selecting synchronized stream data to be multiplexed with a video/audio transport stream, which is inputted from the outside, among the additional data stored in the additional data storing unit, and establishing parameter values necessary to multiplex the selected synchronized stream data and the video/audio transport stream; a synchronized stream data analyzing unit for analyzing the selected synchronized stream data periodically based on the parameter values established in the synchronized stream data selection/establishment unit, and generating information related to the transport stream of the synchronized stream data; a transport stream analyzing unit for analyzing the video/audio transport stream periodically based on the parameter values established in the synchronized stream data selection/establishment unit, and generating information related to the video/audio transport stream; a synchronized stream data injection/management unit for determining whether to inject a data access unit (DAU) that forms the synchronized stream data or not based on the information related to the synchronized stream data transport stream generated in the synchronized stream data analyzing unit and the information related to the video/audio transport stream generated in the transport stream analyzing unit, and controlling the output of the DAU that forms the synchronized stream data which are stored in the additional data storing unit; a presentation time stamp re-stamping unit for re-stamping the presentation time stamp of the synchronized stream data which are outputted from the additional data storing unit based on the parameter values established in the synchronized stream data selection/establishment unit; and a multiplexing unit for multiplexing and outputting the video/audio transport stream and the synchronized data outputted from the presentation time stamp re-stamping unit.

In accordance with another aspect of the present invention, there is provided a method for injecting synchronized stream data for a digital data broadcasting service, including the steps of: a) selecting synchronized stream data that are synchronized with a video/audio transport stream supplied from the outside among additional data used for the digital data broadcasting service, and establishing an injection period which is a time interval for analyzing the video/audio transport stream and the synchronized stream data and injecting the synchronized stream data, the number of analyzed DAU which is the largest number of DAU that can be injected into the video/audio transport stream during the above established injection period, and a new presentation time stamp of a first data access unit (DAU) of the synchronized stream data; b) obtaining the presentation time stamp of a corresponding DAU and the number of transport stream packets by analyzing the selected synchronized stream data periodically based on the injection period and the number of analyzed DAU which are established in the step a), and obtaining as many DAU as the analyzed DAU; c) obtaining PCR information of the video/audio transport stream within the analyzing section by analyzing the video/audio transport stream periodically based on the injection period determined in the step a); d) determining whether to inject the DAU of the synchronized stream data into the video/audio transport stream within the analyzing section or not based on the new presentation time stamp of the first DAU of the synchronized stream data, presentation time stamp of DAU of the synchronized stream data and the PCR information of the video/audio transport stream; e) if the DAU of the synchronized stream data is to be injected into the video/audio transport stream within the analyzing section, re-stamping the presentation time stamp of DAU of the synchronized stream data by using the new presentation time stamp of the first DAU of the synchronized stream data; and f) injecting the DAU of the synchronized stream data whose presentation time stamp is re-stamped newly into the video/audio transport stream and outputting the video/audio transport stream with the DAU.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
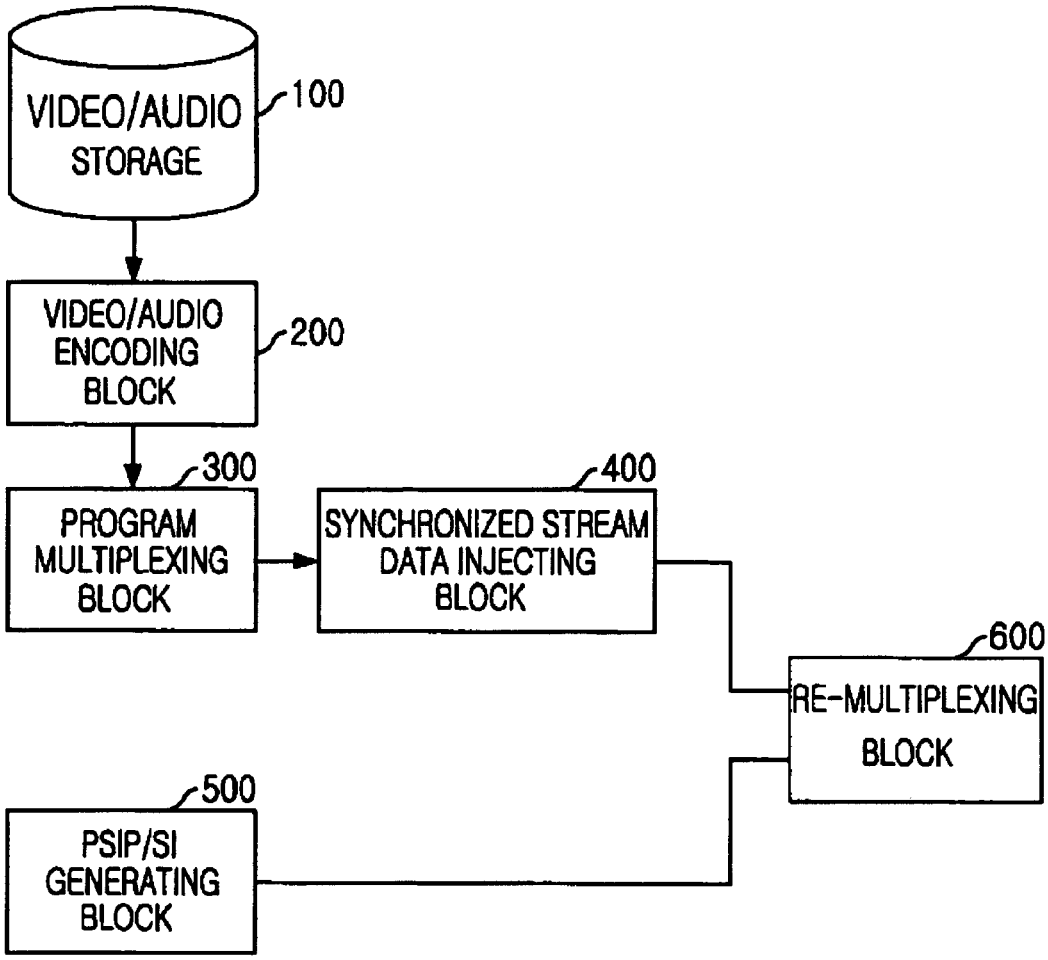
FIG. 1 is a block diagram illustrating a digital data broadcasting system to which the technology of the present invention is applied.

FIG. 1 is a block diagram illustrating a digital data broadcasting system to which the technology of the present invention is applied. As shown in the drawing, the digital data broadcasting system, to which the present invention is applied, includes: a video/audio storage 100, a video/audio encoding block 200, a program multiplexing block (PMUX) 300, a synchronized stream data injecting block 400, a Program and System Information Protocol (PSIP)/Service Information (SI) generating block 500 and a re-multiplexing block 600.

The video/audio storage 100 stores and manages a predetermined size of video/audio data transmitted from the outside.

The video/audio encoding block 200 performs encoding of the video/audio data transmitted from the video/audio storage 100 based on Moving Picture Experts Group 2 (MPEG-2) standards.

The program multiplexing block (PMUX) 300 packetizes the MPEG-2 video/audio elementary stream (ES) transmitted from the video/audio encoding block 200 into a packetized elementary stream (PES). The PMUX 300 also generates program specific information (PSI) or service information (SI) of the PES and converts them into transport stream packets.

The synchronized stream data injecting block 400 selects synchronized stream data, which are synchronized with the MPEG-2 video/audio transport stream, among the additional data in the synchronized stream data injecting block 400, and injects the synchronized stream data into the video/audio transport stream and outputs it.

The PSIP/SI generating block 500 generates, manages and outputs program guidance information (PSIP table or SI table) of an Advanced Television Systems Committee (ATSC) standards or Digital Video Broadcasting (DVB) standards in order to guide the programs of a digital data broadcasting service.

The re-multiplexing block 600 abstracts and re-constructs PSIP/SI/PSI of several transport streams, which are transmitted from the synchronized stream data injecting block 400 and PSIP/SI generating block 500. If necessary, it can give a packet identifier (PID). In addition, it can output a corresponding transport stream by adjusting program clock reference (PCR).

Figure 2:
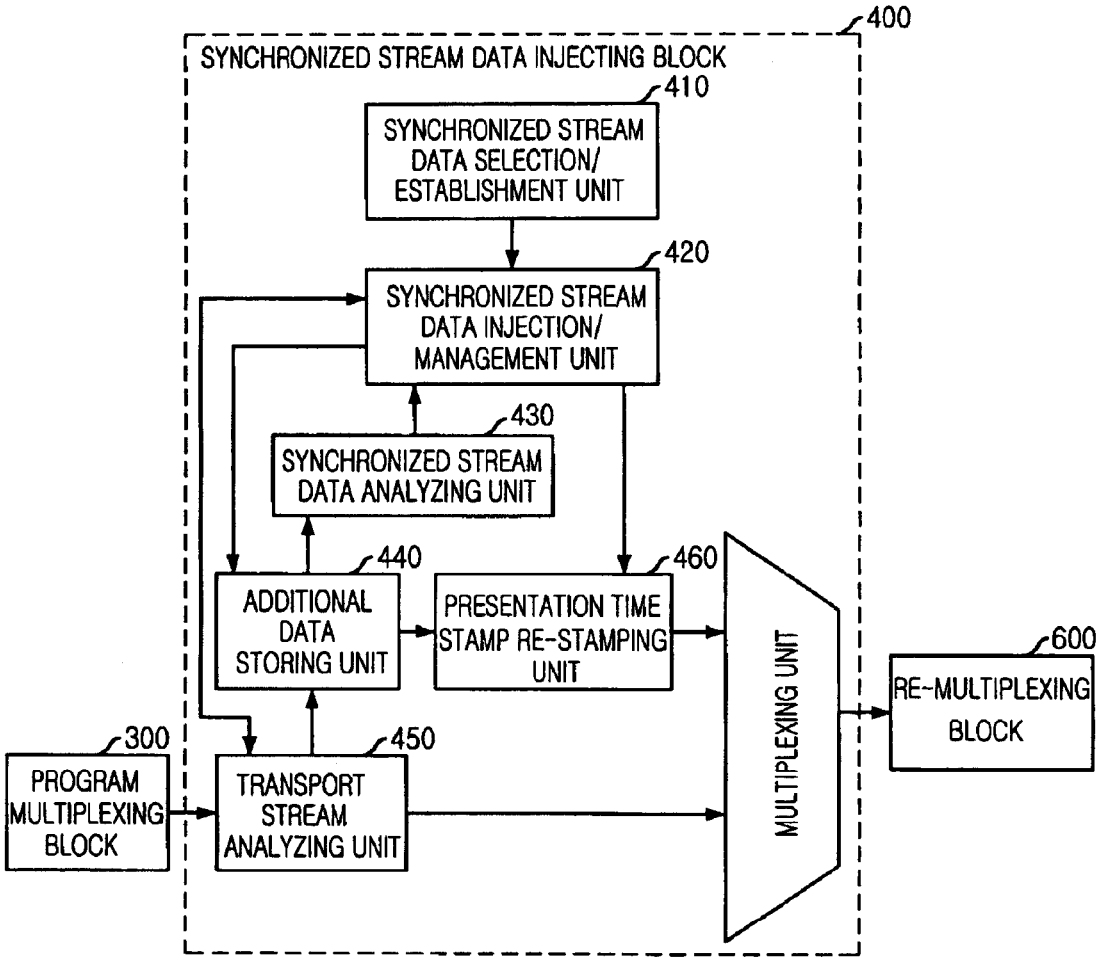
FIG. 2 is a block diagram describing a synchronized data injecting block 400 in accordance with an embodiment of the present invention.

Referring to FIG. 2, the structure of the synchronized stream data injecting block 400 of the present invention will be described herein in a digital broadcasting system having the above-described structure.

FIG. 2 is a block diagram describing a synchronized data injecting block 400 in accordance with an embodiment of the present invention. As illustrated in the drawing, the synchronized data injecting block 400 of the present invention includes: an additional data storing unit 440, a synchronized stream data selection/establishment unit 410, a synchronized stream data injection/management unit 420, a synchronized stream data analyzing unit 430, a transport stream analyzing unit 450, a presentation time stamp re-stamping unit 460 and a multiplexing unit 470.

The additional data storing unit 440 stores, manages and outputs additional data including the synchronized stream data which is encapsulated in the form of an MPEG-2 transport stream that are used in a digital data broadcasting service. Here, the output time point of the synchronized stream data which are stored in the additional data storing unit 440 is determined based on a control signal transmitted from the synchronized stream data injection/management unit 420.

The synchronized stream data selection/establishment unit 410 selects synchronized stream data which are synchronized with a video/audio transport stream inputted from the outside among the additional data stored in the additional data storing unit 440. Also, the synchronized stream data selection/establishment unit 410 establishes the values of parameters, such as an injection period, which is time interval for injecting synchronized stream data into a video/audio transport stream, a new presentation time stamp of a first DAU of the selected synchronized stream data, and the number of analyzed DAU, which means the maximum number of DAU of synchronized stream data that can be injected in one injection period. The synchronized stream data analyzing unit 430 obtains as many DAU as the number of analyzed DAU by analyzing the synchronized stream data selected based on the injection period and the number of analyzed DAU that are established in the additional data selection/establishment unit 410, and generates information related to the synchronized stream data, such as the presentation time stamp of a corresponding DAU, and the number of transport stream packets.

The transport stream analyzing unit 450 analyzes video/audio transport stream periodically based on the injection period established in the additional data selection/establishment unit 410, and generates information related to the video/audio transport stream, such as PCR of video/audio transport stream. Here, the PCR value of transport stream can be obtained directly from a transport stream including PCR within the analysis section, and PCR for another transport stream packet is calculated based on the output rate of MPEG-2 transport stream. Otherwise, PCR values can be obtained by putting a reference clock that increases at 27 MHz which is the same as the per-second increase of PCR in the transport stream analyzing unit 450, obtaining PCR from a transport stream packet including PCR among the inputted MPEG2 transport streams, establishing as the reference clock the same value as the obtained PCR, and obtaining the value of the reference clock at a necessary moment.

The synchronized stream data injection/management unit 420 calculates the presentation time offset value by using the difference between the new presentation time stamp of a first DAU of the synchronized stream data and the presentation time stamp of a first DAU of the synchronized stream data obtained in the synchronized stream data analyzing unit 430, calculates a new presentation time stamp of DAU of the synchronized stream data by adding the presentation time offset value to the presentation time stamp of DAU of the synchronized stream data obtained in the synchronized stream data analyzing unit 430, and compares it with the PCR, which is generated periodically based on the injection periods established in the additional data selection/establishment unit 410, in the transport stream analyzing unit 450. If the new presentation time stamp of DAU is larger than PCR_base of the final part of the video/audio transport stream currently analyzed and smaller than a value obtained by adding the increase of PCR_base that increases during a period to PCR_base of the final part, it is determined as a time point for injecting DAU and a corresponding DAU is controlled to be outputted from the additional data storing unit 440.

Here, the increase of PCR_base increasing for one period can be calculated as shown in FIG. 1 by using the per-second increase of PCR_base, i.e., 90,000, and the injection period established in the additional data selection/establishment unit 410.

$$\text{PCR_base increase during a period} = \text{injection period} \times 90{,}000 \qquad \text{Eq. 1}$$

When a new presentation time stamp is stamped for the synchronized stream data in the synchronized stream data selection/establishment unit 410, the presentation time stamp re-stamping unit 460 re-stamps the presentation time stamp of the synchronized stream data into the new presentation time stamp.

The multiplexing unit 470 injects DAU of the synchronized stream data, which are outputted from the presentation time stamp re-stamping unit 460, into the video/audio transport stream outputted from the transport stream analyzing unit 450.

Figure 3:
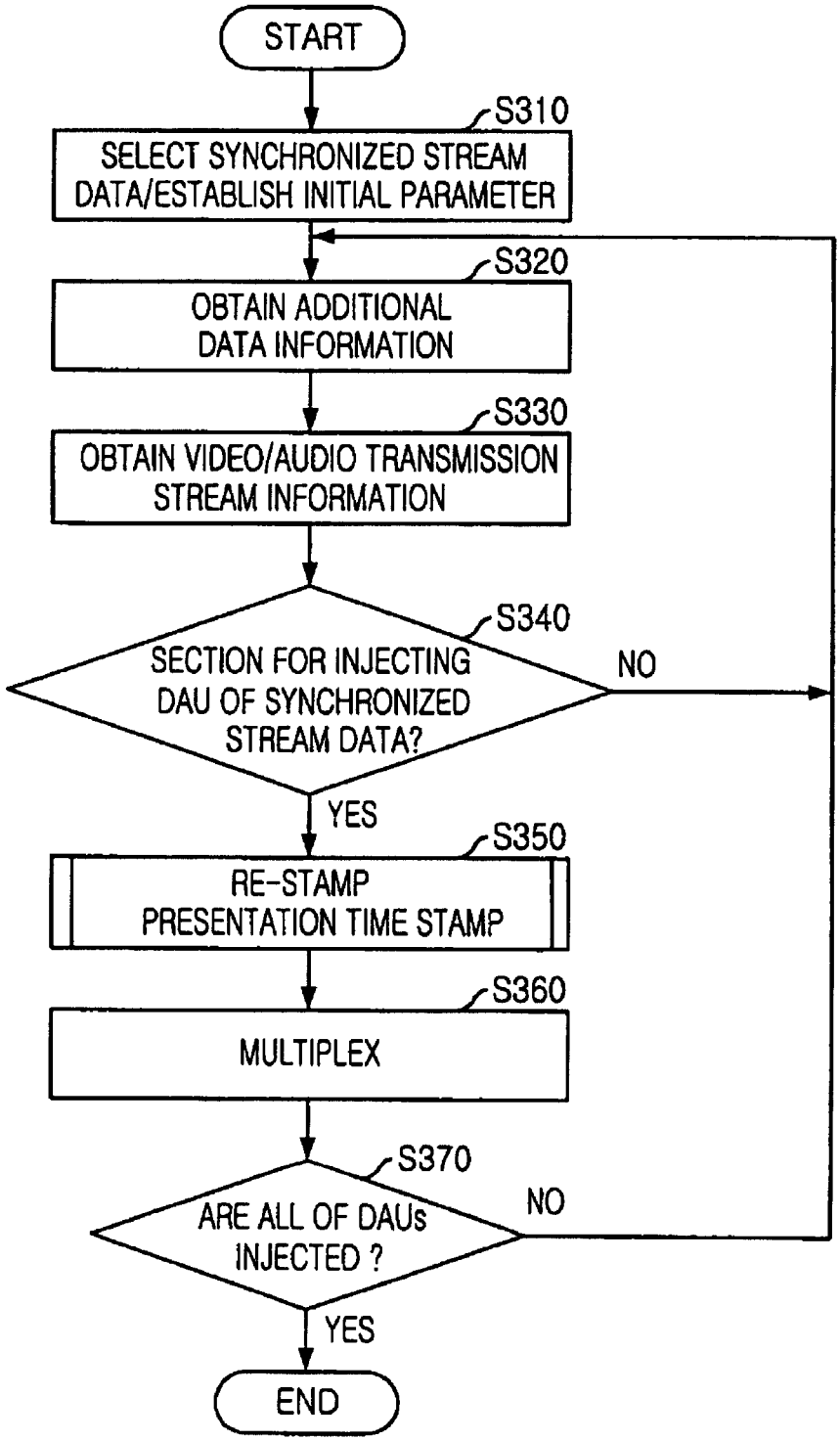
FIG. 3 is a flow chart describing a synchronized stream data injecting process of the synchronized data injecting block 400 in accordance with an embodiment of the present invention.

Referring to FIG. 3, the operation of the synchronized stream data injecting block 400 having the above-described structure will be described hereinafter.

FIG. 3 is a flow chart describing a synchronized stream data injecting process of the synchronized stream data injecting block 400 in accordance with an embodiment of the present invention. As illustrated in the drawing, at step S310, the synchronized stream data selection/establishment unit 410 of the synchronized stream data injecting block 400 selects synchronized stream data that are synchronized with the video/audio transport stream inputted from the outside among the additional data stored in the additional data storing unit 440.

Also, it establishes the values of parameters, such as an injection period, which is time interval for injecting synchronized stream data into a video/audio transport stream, a new presentation time stamp of a first DAU of the above-selected synchronized stream data, and the number of analyzed DAU, which means the maximum number of DAU of synchronized stream data that can be injected in one injection period. Here, if the number of analyzed DAU is not established, it is calculated by multiplying the largest value (59.94 or 60) of the number of frequency of DAU generation to the established injection period. If both injection period and the number of analyzed DAU are not established, the injection period is set to be 50 msec and the number of analyzed DAU is determined to be 3.

Subsequently, at step S320, the synchronized stream data analyzing unit 430 analyzes the synchronized stream data selected in the additional data selection/establishment unit 410 based on the injection period and the number of analyzed DAU, which are established in the additional data selection/establishment unit 410, periodically to obtain as many DAU as the number of analyzed DAU, and generates information related to synchronized stream data, such as presentation time stamp of a corresponding DAU, the number transport stream packets.

Subsequently, at step S330, the transport stream analyzing unit 450 periodically analyzes the video/audio transport stream inputted from the outside in real-time based on the injection period established in the additional data selection/establishment unit 410, and generates information needed to inject the synchronized stream data, such as PCR of the video/audio transport stream within the analysis section.

Subsequently, at step S340, it is determined whether it is a section for injecting DAUs of a synchronized stream data. The synchronized stream data injection/management unit 420 calculates a presentation time offset by using the difference between a new presentation time stamp of a first DAU of the synchronized stream data established in the additional data selection/establishment unit 410 and the presentation time stamp of a first DAU of the synchronized stream data obtained in the synchronized stream data analyzing unit 430.

Then, the synchronized stream data injection/management unit 420 calculates a new presentation time stamp of DAU of the synchronized stream data obtained in the synchronized stream data analyzing unit 430. It determines whether to inject DAU of the synchronized stream data into the video/audio transport stream within the analysis section by comparing the new presentation time stamp calculated above with PCR obtained from the analysis of the video/audio transport stream. If the DAU of the synchronized stream data is determined for injection, synchronized stream data injection/management unit 420 controls the additional data storing unit 440 to output corresponding DAU.

Subsequently, at step S350, if a new presentation time stamp is established with respect to a first DAU of synchronized stream data in the synchronized stream data selection/establishment unit 410, the presentation time stamp re-stamping unit 460 re-stamps the presentation time stamp of DAU that forms synchronized stream data outputted from the additional data storing unit 440 based on the control of the synchronized stream data injection/management unit 420, by referring to the presentation time stamp newly stamped in the synchronized stream data selection/establishment unit 410. If the DAU of the synchronized stream data is not injected, process goes back to the step S320.

Here, to re-stamp the presentation time stamp of all DAU that form synchronized stream data, a presentation time offset value is calculated by using the difference between the presentation time stamp of the first DAU of the synchronized stream data and the new presentation time stamp stamped in the synchronized stream data selection/establishment unit 410. Here, the summation of the presentation time stamp of the first DAU of the synchronized stream data and the calculated presentation time offset value should be equal to the new presentation time stamp.

The presentation time stamp of all DAU that forms the synchronized stream data is re-stamped by adding the presentation time offset value to the presentation time stamp of all DAU of the synchronized stream data.

Subsequently, at step S360, the multiplexing unit 470 injects the DAU of the synchronized stream data outputted from the presentation time stamp re-stamping unit 460 into the video/audio transport stream outputted from the transport stream analyzing unit 450 and outputs one transport stream.

At step 370, it is determined whether all of DAUs are injected or not. If all of DAUs are not injected, i.e., is there any DAU to be injected, process continues to the step S320.

Figure 4:
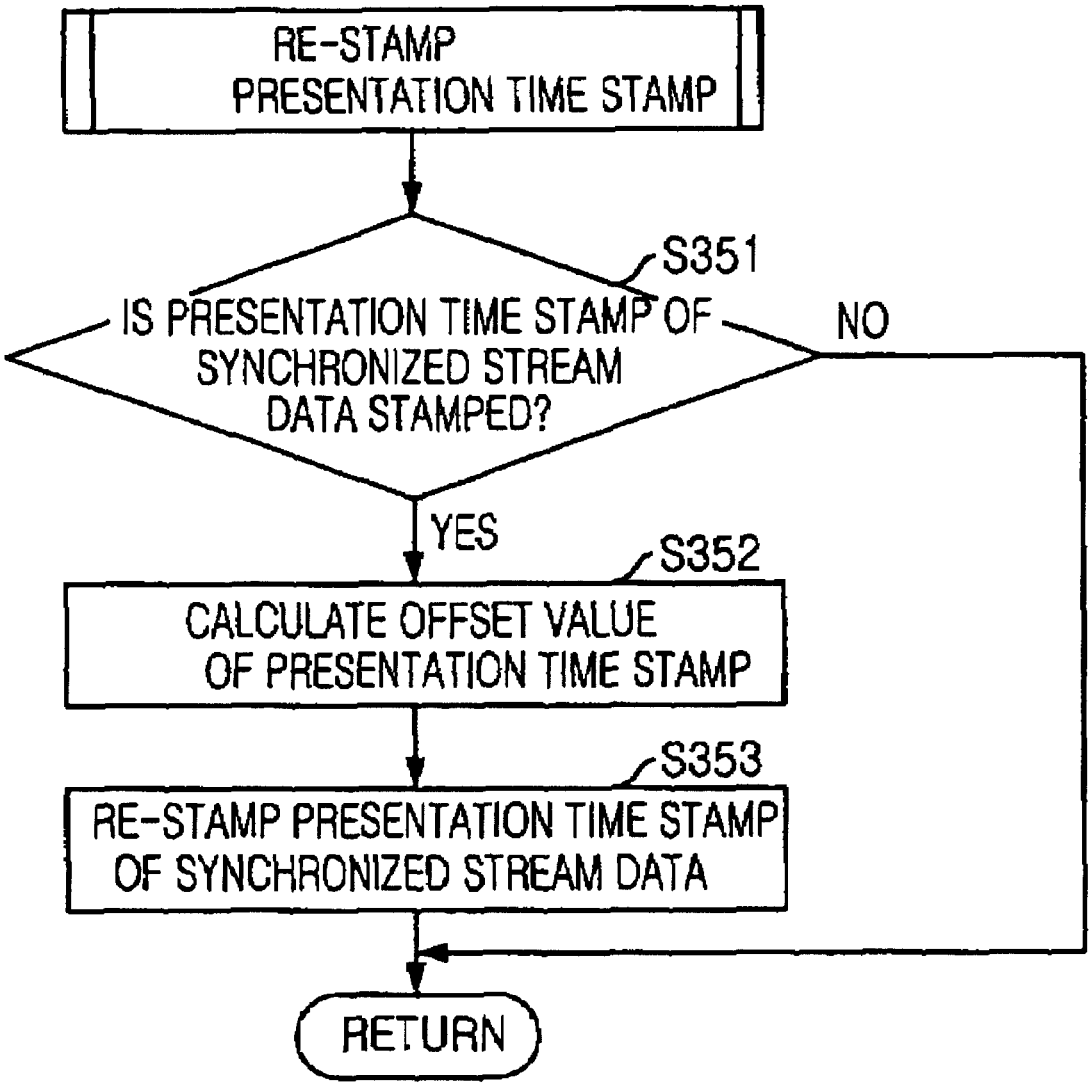
FIG. 4 is a flow chart further describing a process for re-stamping the presentation time stamp of additional data in the synchronized stream data injecting process in accordance with an embodiment of the present invention.

FIG. 4 is a flow chart further describing a process (S350) for re-stamping the presentation time stamp of additional data in the synchronized stream data injecting process in accordance with an embodiment of the present invention.

First, to re-stamp the presentation time stamp of DAU that forms synchronized stream data, at step S351, it is checked if a new presentation time stamp of a first DAU of synchronized stream data is stamped through the synchronized stream data selection/establishment unit 410.

If a new presentation time stamp of the first DAU of the synchronized stream data is not stamped, the presentation time stamp re-stamping process is terminated, and if a new presentation time stamp is stamped, at step S352, the presentation time offset value is calculated. The presentation time offset value of the synchronized stream data can be obtained by subtracting the actual presentation time stamp the first DAU of the synchronized stream data from the newly stamped presentation time stamp of the first DAU of the synchronized stream data, as shown in below Equation 2.

$$\text{presentation time offset } (PTS_{off}) = \text{new presentation time stamp} - \text{presentation time stamp of a first DAU} \quad \text{Eq. 2}$$

When the presentation time offset of the synchronized stream data is calculated, at step S353, the re-stamped presentation time stamp of each DAU that forms the synchronized stream data is calculated and re-stamped. The re-stamped presentation time stamp of DAU that forms synchronized stream data can be calculated by adding the presentation time offset to the presentation time stamp of all DAU that form the synchronized stream data, as shown in Equation 3.

$$\text{Re-stamped presentation time stamp of DAU} = \text{Presentation time stamp of a DAU} + PTS_{off} \quad \text{Eq. 3}$$

As described above, the present invention discloses an apparatus for injecting synchronized stream data, which is a stream data synchronized with audio/video data temporally, into an MPEG-2 video/audio transport stream. This technology can be used to establish a digital data broadcasting system that can provide a synchronized stream data service, which is capable of providing more diverse data service to viewers.

While the present invention has been described with respect to certain preferred embodiments, it will be apparent to those skilled in the art that various changes and modifications may be made without departing from the scope of the invention as defined in the following claims.

What is claimed is:

1. An apparatus for injecting synchronized stream data for a digital data broadcasting service, comprising:

an additional data storing means for storing, managing and outputting additional data used for the digital data broadcasting service;

a synchronized stream data selection/establishment means for selecting synchronized stream data to be multiplexed with a video/audio transport stream, which is inputted from the outside, among the additional data stored in the additional data storing means, and establishing parameter values necessary to multiplex the selected synchronized stream data and the video/audio transport stream;

a synchronized stream data analyzing means for analyzing the selected synchronized stream data periodically based on the parameter values established in the synchronized stream data selection/establishment means, and generating information related to the transport stream of the synchronized stream data;

a transport stream analyzing means for analyzing the video/audio transport stream periodically based on the parameter values established in the synchronized stream data selection/establishment means, and generating information related to the video/audio transport stream;

a synchronized stream data injection/management means for determining whether to inject a data access unit (DAU) that forms the synchronized stream data or not based on the information related to the synchronized stream data transport stream generated in the synchronized stream data analyzing means and the information related to the video/audio transport stream generated in the transport stream analyzing means, and controlling the output of the DAU that forms the synchronized stream data which are stored in the additional data storing means;

a presentation time stamp re-stamping means for re-stamping the presentation time stamp of the synchronized stream data which are outputted from the additional data storing means based on the parameter values established in the synchronized stream data selection/establishment means; and a multiplexing means for multiplexing and outputting the video/audio transport stream and the synchronized stream data outputted from the presentation time stamp re-stamping means.

2. The apparatus as recited in claim 1, wherein the parameter values established in the synchronized stream data selection/establishment means include at least any one selected from a group having a new presentation time stamp of a first DAU of the synchronized stream data;

an injection period, which is a time interval for analyzing the video/audio transport stream and synchronized stream data and injecting the synchronized stream data to the video/audio transport stream; and the number of analyzed DAUs within the analyzed synchronized stream data during the above established injection period.

3. The apparatus as recited in claim 1, wherein if the number of analyzed DAUs is not established in the synchronized stream data selection/establishment means, the synchronized stream data selection/establishment means calculates the number of analyzed DAUs by multiplying the largest value (59.94 or 60) of the number of frequency of DAU generation to the established injection period, and if the injection period and the number of analyzed DAUs are not established in the synchronized stream data selection/establishment means, the injection period and the number of DAU to be injected are determined to be 50 msec and 3, respectively.

4. The apparatus as recited in claim 1, wherein if synchronized stream data synchronized with the video/audio transport stream are not stored in the additional data storing means, the synchronized stream data selection/establishment means receives the synchronized stream data from the outside and stores the synchronized stream data in the additional data storing means.

5. The apparatus as recited in claim 1, wherein the synchronized stream data analyzing means obtains many as DAUs as the analyzed DAU by analyzing the synchronized stream data selected in the synchronized stream data selection/establishment means based on an injection period and the number of analyzed DAUs established in the synchronized stream data selection/establishment means, and obtains the presentation time stamp of a corresponding DAU and the number of transport stream packets.

6. The apparatus as recited in claim 1, wherein the transport stream analyzing means analyzes the video/audio transport stream periodically based on an injection period established in the synchronized stream data selection/establishment means, and obtains the program clock references (PCRs) of a beginning part and a final part of an analyzing section of the video/audio transport stream analyzed during one injection period.

7. The apparatus as recited in claim 1, wherein in order to calculate PCR of the transport stream, the transport stream analyzing means directly obtains a PCR value from a transport stream including PCR within an analyzing section, obtains PCR from the transport stream packets including PCR among an inputted MPEG-2 transport streams by calculating the PCR for another transport stream packet using an output rate of the MPEG-2 transport stream, or by having a reference clock that increases at 27 MHz which is a per-second increase of PCR of the transport stream analyzing means, and obtains the PCR value by establishing the value of the reference clock with the same value as the obtained PCR and then obtaining the value of the reference clock at a moment when the PCR value is needed.

8. The apparatus as recited in claim 1, wherein the synchronized stream data injection/management means calculates the presentation time offset value by using the difference between the new presentation time stamp of a first DAU of the synchronized stream data established in the synchronized stream data selection/establishment means and the presentation time stamp of the first DAU of the synchronized stream data obtained in the synchronized stream data analyzing means, calculates a new presentation time stamp of DAU of the synchronized stream data by adding the presentation time offset value to the presentation time stamp of DAU of the synchronized stream data obtained periodically in the synchronized stream data analyzing means, compares the calculated new presentation time stamp with the PCR generated periodically based on an injection period, which is established in the synchronized stream data selection/establishment means, in the transport stream analyzing means, and if the new presentation time stamp of DAU is larger than the PCR in the final part of the video/audio transport stream currently analyzed and smaller than the summation of the PCR increase during one period and the PCR of the final part, determines to inject the corresponding DAU, and controls the additional data storing means to output the corresponding DAU.

9. The apparatus as recited in claim 1, wherein if a new presentation time stamp for an first DAU is stamped in the synchronized stream data selection/establishment means, the presentation time stamp re-stamping means receives synchronized stream data outputted from the additional data storing means, re-stamps the presentation time stamp of a DAU that forms the synchronized stream data by referring to the presentation time stamp newly stamped in the synchronized stream data selection/establishment means, and outputs the re-stamped presentation time stamp of the DAU to the multiplexing means, and wherein, to re-stamp the presentation time stamp of all DAUs that form the synchronized stream data, the presentation time stamp re-stamping means calculates a presentation time offset value by using the difference between the presentation time stamp of the first DAU of the synchronized stream data and the new presentation time stamp stamped in the synchronized stream data selection/establishment means, and re-stamps the presentation time stamp of all DAUs that form the synchronized stream data by adding the presentation time offset value to the presentation time stamp of all DAUs that form the synchronized stream data.

10. The apparatus as recited in claim 1, wherein the multiplexing means injects the DAU of the synchronized stream data outputted from the presentation time stamp re-staming means into the places of null packets in the video/audio transport stream within a section analyzed in the transport stream analyzing means, instead of the null packets.

11. The apparatus as recited in claim 1, wherein if the number of DAUs multiplexed in the video/audio transport stream analyzed in the transport stream analyzing means is more than two, the multiplexing means injects the DAUs into the video/audio transport stream in the order of quick presentation time stamp, and the locations for DAU to be injected into are moved from a part where PCR of the analyzed video/audio transport stream is small to a part where PCR of the analyzed video/audio transport stream is large.

12. A method for injecting synchronized stream data for a digital data broadcasting service, comprising the steps of:

a) selecting synchronized stream data that are synchronized with a video/audio transport stream supplied from the outside among additional data used for the digital data broadcasting service, and establishing an injection period which is a time interval for analyzing the video/audio transport stream and the synchronized stream data and injecting the synchronized stream data, the number of analyzed DAUs which is the largest number of DAUs that can be injected into the video/audio transport stream during the above established injection period, and a new presentation time stamp of a first data access unit (DAU) of the synchronized stream data;

b) obtaining the presentation time stamp of a corresponding DAU and the number of transport stream packets by analyzing the selected synchronized stream data periodically based on the injection period and the number of analyzed DAU which are established in the step a), and obtaining as many as DAUs as the analyzed DAUs;

c) obtaining PCR information of the video/audio transport stream within an analyzing section by analyzing the video/audio transport stream periodically based on the injection period determined in the step a);

d) determining whether to inject the DAU of the synchronized stream data into the video/audio transport stream within the analyzing section or not based on the new presentation time stamp of the first DAU of the synchronized stream data, presentation time stamp of DAU of the synchronized stream data and the PCR information of the video/audio transport stream;

e) if the DAU of the synchronized stream data is to be injected into the video/audio transport stream within the analyzing section, re-stamping the presentation time stamp of DAU of the synchronized stream data by using the new presentation time stamp of the first DAU of the synchronized stream data; and f) injecting the DAU of the synchronized stream data whose presentation time stamp is re-stamped newly into the video/audio transport stream and outputting the video/audio transport stream with the DAU.

13. The method as recited in claim 12, further comprising the step of:

g) going back to the step b) if the analyzing section does not satisfy the condition for injecting the DAU.

14. The method as recited in claim 12, further comprising the step of:

h) determining whether all of the DAUs of synchronized stream data are injected or not, and going back to the step b) if there remain any of the DAUs to be injected, otherwise, ending the method.

15. The method as recited in claim 12, wherein the step a) includes the steps of:

a1) if the number of analyzed DAU is not established, calculating the number of analyzed DAU by multiplying the largest value (59.94 or 60) of the number of frequency of DAU generation to the injection period established above; and a2) if the injection period and the number of analyzed DAU are not established, determining the injection period and the number of analyzed DAU to be 50 msec and 3, respectively.

16. The method as recited in claim 12, wherein the PCRs of the beginning part and the final part of the analyzing section of the video/audio transport stream analyzed during one injection period are obtained by analyzing the video/audio transport stream periodically based on the injection period.

17. The method as recited in claim 12, wherein said step d) includes the steps of:

d1) calculating a new presentation time stamp one of the DAUs based on the new presentation time stamp of a first DAU of the synchronized stream data established in the step a) and the presentation time stamp of DAU of the synchronized stream data which are obtained periodically at the step b);

d2) comparing the new presentation time stamp of the DAU with the PCR information of the video/audio transport stream obtained in the step c);

d3) if the new substantial presentation time stamp of the DAU is larger than a base value PCR_base of the PCR of the video/audio transport stream and smaller than a summation value of increase of the base value PCR_base during one injection period and the base value PCR_base of the PCR of the video/audio transport stream, deciding a time to inject the DAU of the synchronized stream data into the video/audio transport stream.

18. The method as recited in claim 17, wherein the step d1) includes the steps of:

d1-1) calculating a presentation time offset value by using the difference between the new presentation time stamp of the first DAU of the synchronized stream data established in the step a) and the presentation time stamp of the first DAU of the synchronized stream data obtained in the step b); and d1-2) calculating the new presentation time stamp of the DAU of the synchronized stream data by adding the presentation time offset value to the presentation time stamp of DAU of the synchronized stream data.

19. The method as recited in claim 12, wherein the step e) includes the steps of:

e1) checking if a new presentation time stamp for the first DAU of the selected synchronized stream data is established;

e2) if a new presentation time stamp for the first DAU of the selected synchronized stream data is established, calculating a presentation time offset value [by subtracting the presentation time stamp of the first DAU of the actual synchronized stream data from the new presentation time stamp, or otherwise, terminating the process of re-stamping the presentation time stamp]; and e3) adding the calculated presentation time offset value to the actual presentation time stamp of all DAUs of the inputted synchronized stream data.

20. The method as recited in claim 19, wherein the step e) further includes the step of:

if a new presentation time stamp for the first DAU of the selected synchronized stream data is not established, returning to the step f).

21. An apparatus for injecting synchronized stream data for a digital data broadcasting service, comprising:

an additional data storing unit that stores, manages, and outputs additional data used for the digital data broadcasting service;

a synchronized stream data selection/establishment unit that selects synchronized stream data to be multiplexed with a video/audio transport stream, which is inputted from the outside, among the additional data stored in the additional data storing unit, and establishes parameter values necessary to multiplex the selected synchronized stream data and the video/audio transport stream;

a synchronized stream data analyzing unit that analyzes the selected synchronized stream data periodically based on the parameter values established in the synchronized stream data selection/establishment unit, and generates information related to the transport stream of the synchronized stream data;

a transport stream analyzing unit that analyzes the video/audio transport stream periodically, and generates information related to the video/audio transport stream;

a synchronized stream data injection/management unit that determines whether to inject a data access unit (DAU) that forms the synchronized stream data or not based on the information related to the synchronized stream data transport stream generated in the synchronized stream data analyzing unit and the information related to the video/audio transport stream generated in the transport stream analyzing unit, and controls the output of the DAU that forms the synchronized stream data which are stored in the additional data storing unit;

a presentation time stamp re-stamping unit that re-stamps the presentation time stamp of the synchronized stream data which are outputted from the additional data storing unit based on the parameter values established in the synchronized stream data selection/establishment unit; and a multiplexing unit that multiplexes and outputs the video/audio transport stream and the synchronized stream data outputted from the presentation time stamp re-stamping unit.

22. A method for injecting synchronized stream data for a digital data broadcasting service, comprising the steps of:

a) selecting synchronized stream data that are synchronized with a video/audio transport stream supplied from the outside among additional data used for the digital data broadcasting service, and establishing an injection period which is a time interval for analyzing the video/audio transport stream and the synchronized stream data and injecting the synchronized stream data, the number of analyzed DAUs which is the largest number of DAUs that can be injected into the video/audio transport stream during the above established injection period, and a new presentation time stamp of a first data access unit (DAU) of the synchronized stream data;

b) obtaining the presentation time stamp of a corresponding DAU and the number of transport stream packets by analyzing the selected synchronized stream data periodically based on the injection period and the number of analyzed DAU which are established in the step a), and obtaining as many as DAUs as the analyzed DAUs;

c) obtaining PCR information of the video/audio transport stream within an analyzing section by analyzing the video/audio transport stream periodically;

d) determining whether to inject the DAU of the synchronized stream data into the video/audio transport stream within the analyzing section or not based on the new presentation time stamp of the first DAU of the synchronized stream data, presentation time stamp of DAU of the synchronized stream data and the PCR information of the video/audio transport stream;

e) if the DAU of the synchronized stream data is to be injected into the video/audio transport stream within the analyzing section, re-stamping the presentation time stamp of DAU of the synchronized stream data by using the new presentation time stamp of the first DAU of the synchronized stream data; and f) injecting the DAU of the synchronized stream data whose presentation time stamp is re-stamped newly into the video/audio transport stream and outputting the video/audio transport stream with the DAU.

23. An apparatus configured to inject synchronized stream data into a transport stream, the apparatus comprising:

a data storing unit configured to store synchronized stream data;

a synchronized stream data selection/establishment unit configured to select synchronized stream data corresponding to the transport stream;

a synchronized stream data analyzing unit configured to analyze the selected synchronized stream data and generate information related to the synchronized stream data;

a transport stream analyzing unit configured to analyze the transport stream and generate information related to the transport stream;

a synchronized stream data injection/management unit configured to determine whether to inject the selected synchronized stream data based on the information related to the synchronized stream data and the information related to the transport stream, and control the data storing unit to output the corresponding synchronized stream data based on the determination;

a presentation time stamp re-stamping unit configured to re-stamp the synchronized stream data outputted from the data storing unit with a new presentation time stamp; and a multiplexing unit configured to multiplex the transport stream and the synchronized stream data.

24. The apparatus as recited in claim 23, wherein the synchronized stream data is encapsulated in a MPEG-2 transport stream form.

25. The apparatus as recited in claim 23, wherein if the additional data storing unit does not store the synchronized stream data corresponding to the transport stream, the synchronized stream data selection/establishment unit is further configured to receive the synchronized stream data from outside and store the received synchronized stream data in the data storing unit.

26. The apparatus as recited in claim 23, wherein the synchronized stream data selection/establishment unit is further configured to establish parameter values.

27. The apparatus as recited in claim 26, wherein the parameter values comprise:

a new presentation time stamp of a first data access unit (DAU) of the selected synchronized stream data:

an injection period, wherein the injection period is a time interval for injecting the synchronized stream data into the transport stream; and a maximum number of DAUs of the synchronized stream data that can be injected in one injection period.

28. The apparatus as recited in claim 27, wherein the synchronized stream data analyzing unit is further configured

*to obtain as many DAUs as the maximum number of the DAUs by analyzing the selected synchronized stream data based on the parameter values.*

*29. The apparatus as recited in claim 27, wherein the transport stream analyzing unit is further configured to periodically analyze the transport stream based on the parameter values.*

*30. The apparatus as recited in claim 23, wherein the information related to the synchronized stream data comprises:*

*a presentation time stamp of a corresponding DAU; and*

*a number of transport stream packets.*

*31. The apparatus as recited in claim 30, wherein the synchronized stream data injection/management unit is further configured to calculate a presentation time offset by using a difference between the new presentation time stamp of a first data access unit (DAU) of the selected synchronized stream data and a presentation time stamp of a corresponding DAU generated from the synchronized stream data analyzing unit.*

*32. The apparatus as recited in claim 31, wherein the synchronized stream data injection/management unit is further configured to calculate a new presentation time stamp of DAU of the synchronized stream data by adding the presentation time offset to the presentation time stamp of a corresponding DAU.*

*33. The apparatus as recited in claim 32, wherein the synchronized stream data injection/management unit is further configured to compare the new presentation time stamp of DAU with the presentation time stamp of a corresponding DAU generated in the transport analyzing unit.*

*34. The apparatus as recited in claim 33, wherein if the new presentation time stamp of DAU is larger than the PCR in the final part of the video/audio transport stream currently analyzed and smaller than the summation of the PCR increase during one period and the PCR of the final part, the synchronized stream data injection/management unit is further configured to determine to inject the corresponding DAU, and control the data storing unit to output the corresponding DAU.*

*35. The apparatus as recited in claim 23, wherein the information related to the transport stream is a program clock reference (PCR) of the transport stream.*

*36. The apparatus as recited in claim 35, wherein the transport stream analyzing unit is further configured to obtain the PCR directly from the transport stream including PCR within an analyzing section, and calculate PCR for another transport stream packet based on an output rate of the transport stream.*

*37. The apparatus as recited in claim 35, wherein the transport stream analyzing unit is further configured to obtain the PCR by putting a reference clock that increases as 27 MHz, wherein the 27 MHz is a per-second increase of PCR of the transport stream analyzing unit.*

*38. The apparatus as recited in claim 35, wherein the transport stream analyzing unit is further configured to obtain the PCR by establishing a value of the reference clock with the same value as the obtained PCR and obtain the value of the reference clock at a moment when the PCR value is needed.*

*39. The apparatus as recited in claim 23, wherein if a new presentation time stamp for a first DAU is stamped in the synchronized stream data selection/establishment unit, the presentation time stamp re-stamping unit is further configured to:*

*receive the synchronized stream data outputted from the data storing unit;*

*re-stamp the presentation time stamp of a DAU by referring to the presentation time stamp newly stamped in the synchronized stream data selection/establishment unit; and*

*output the re-stamped presentation time stamp of the DAU to the multiplexing unit.*

*40. The apparatus as recited in claim 39, wherein the presentation time stamp re-stamping unit is further configured to:*

*calculate a presentation time offset value by using the difference between the presentation time stamp of the first DAU of the synchronized stream data and the new presentation time stamp stamped in the synchronized stream data selection/establishment unit; and*

*re-stamp the presentation time stamp of all DAUs by adding the presentation time offset value to the presentation time stamp of all DAUs.*

*41. The apparatus as recited in claim 23, wherein the multiplexing unit is further configured to inject DAUs of the synchronized stream data outputted from the presentation time stamp re-stamping unit into the places of null packets in the transport stream within a section analyzed in the transport stream analyzing unit, instead of the null packets.*

*42. The apparatus as recited in claim 23, wherein if a number of DAUs of the synchronized stream data multiplexed in the transport stream analyzed in the transport stream analyzing unit is more than two, the multiplexing unit is further configured to inject the DAUs into the transport stream in the order of quick presentation time stamp, and the locations for DAU to be injected into are moved from a part where PCR of the analyzed transport stream is small to a part where PCR of the analyzed transport stream is large.*

*43. A method for injecting synchronized stream data into a transport stream, the method comprising:*

*selecting synchronized stream data corresponding to the transport stream;*

*analyzing the selected synchronized stream data and generating information related to the synchronized stream data;*

*analyzing the transport stream and generating information related to the transport stream;*

*determining whether to inject the selected synchronized stream data based on the information related to the synchronized stream data and the information related to the transport stream:*

*outputting the corresponding synchronized stream data based on the determination;*

*re-stamping the synchronized stream data outputted with a new presentation time stamp; and*

*multiplexing the transport stream and the synchronized stream data.*

*44. The method as recited in claim 43, wherein the synchronized stream data is encapsulated in a MPEG-2 transport stream form.*

*45. The method as recited in claim 43, wherein the method further comprises a step of establishing parameter values.*

*46. The method as recited in claim 45, wherein the parameter values comprise:*

*the new presentation time stamp of a first data access unit (DAU) of the selected synchronized stream data;*

*an injection period, wherein the injection period is a time interval for injecting the synchronized stream data into the transport stream; and*

*a maximum number of DAUs of the synchronized stream data that can be injected in one injection period.*

*47. The method as recited in claim 46, wherein the method further comprises a step of obtaining as many DAUs as the*

*maximum number of the DAUs by analyzing the selected synchronized stream data based on the parameter values.*

*48. The method as recited in claim 46, wherein the step of analyzing the transport stream further comprises a step of periodically analyzing the transport stream based on the parameter values.*

*49. The method as recited in claim 43, wherein the information related to the synchronized stream data comprises:*

*a presentation time stamp of a corresponding DAU; and*

*a number of transport stream packets.*

*50. The method as recited in claim 49, wherein the method further comprises a step of calculating a presentation time offset by using a difference between the new presentation time stamp of a first data access unit (DAU) of the selected synchronized stream data and a presentation time stamp of a corresponding DAU generated from the synchronized stream data analyzing unit.*

*51. The method as recited in claim 50, wherein the method further comprises a step of calculating a new presentation time stamp of DAU of the synchronized stream data by adding the presentation time offset to the presentation time stamp of a corresponding DAU.*

*52. The method as recited in claim 51, wherein the method further comprises of a step of comparing the new presentation time stamp of DAU with the presentation time stamp of a corresponding DAU generated in the transport analyzing unit.*

*53. The method as recited in claim 52, wherein the corresponding synchronized stream data is outputted if the new presentation time stamp of DAU is larger than the PCR in the final part of the video/audio transport stream currently analyzed and smaller than the summation of the PCR increase during one period and the PCR of the final part.*

*54. The method as recited in claim 43, wherein the information related to the transport stream is a program clock reference (PCR) of the transport stream.*

*55. The method as recited in claim 43, wherein the step of analyzing the transport stream further comprises a step of obtaining a PCR directly from the transport stream including PCR within an analyzing section, and calculating PCR for another transport stream packet based on an output rate of the transport stream.*

*56. The method as recited in claim 43, wherein the step of analyzing the transport stream further comprises a step of obtaining the PCR by putting a reference clock that increases as 27 MHz, wherein the 27 MHz is a per-second increase of PCR of the transport stream analyzing unit.*

*57. The method as recited in claim 43, wherein the step of analyzing the transport stream further comprises a step of obtaining the PCR by establishing a value of the reference clock with the same value as the obtained PCR and obtaining the value of the reference clock at a moment when the PCR value is needed.*

*58. The method as recited in claim 43, wherein if a new presentation time stamp for a first DAU is stamped in the synchronized stream data selection/establishment unit, the step of re-stamping comprises a step of:*

*receiving the outputted synchronized stream data;*

*re-stamping the presentation time stamp of a DAU by referring to the newly stamped presentation time stamp; and*

*outputting the re-stamped presentation time stamp of the DAU.*

*59. The method as recited in claim 58, wherein the step of re-stamping further comprises of a step of:*

*calculating a presentation time offset value by using the difference between the presentation time stamp of the first DAU of the synchronized stream data and the new presentation time stamp stamped; and*

*re-stamping the presentation time stamp of all DAUs by adding the presentation time offset value to the presentation time stamp of all DAUs.*

*60. The method as recited in claim 43, wherein the step of multiplexing comprises a step of injecting DAUs of the outputted synchronized stream data into the places of null packets in the transport stream within a section analyzed, instead of the null packets.*

*61. The method as recited in claim 43, wherein if a number of DAUs of the synchronized stream data multiplexed in the transport stream analyzed is more than two, the step of multiplexing further comprises a step of injecting the DAUs into the transport stream in the order of quick presentation time stamp, and the locations for DAU to be injected into are moved from a part where PCR of the analyzed transport stream is small to a part where PCR of the analyzed transport stream is large.*

*62. An apparatus configured to inject synchronized stream data into a transport stream, the apparatus comprising:*

*a synchronized stream data selection/establishment unit configured to select synchronized stream data corresponding to the transport stream;*

*a synchronized stream data analyzing unit configured to analyze the selected synchronized stream data and generate information related to the synchronized stream data;*

*a transport stream analyzing unit configured to analyze the transport stream and generate information related to the transport stream;*

*a synchronized stream data injection/management unit configured to determine whether to inject the selected synchronized stream data based on the information related to the synchronized stream data and the information related to the transport stream, and control the data storing unit to output the corresponding synchronized stream data based on the determination; and*

*a presentation time stamp re-stamping unit configured to re-stamp the synchronized stream data outputted from the data storing unit with a new presentation time stamp.*

*63. A method for injecting synchronized stream data into a transport stream, the method comprising:*

*selecting synchronized stream data corresponding to the transport stream;*

*analyzing the selected synchronized stream data and generating information related to the synchronized stream data;*

*analyzing the transport stream and generating information related to the transport stream;*

*determining whether to inject the selected synchronized stream data based on the information related to the synchronized stream data and the information related to the transport stream;*

*outputting the corresponding synchronized stream data based on the determination; and*

*re-stamping the synchronized stream data outputted with a new presentation time stamp.*

* * * * *